US011412370B2

(12) United States Patent
Won et al.

(10) Patent No.: US 11,412,370 B2
(45) Date of Patent: Aug. 9, 2022

(54) METHOD AND SYSTEM FOR LOW DENSITY HOSTED TELEPHONY REGULATORY COMPLIANCE

(71) Applicant: JPMorgan Chase Bank, N.A., New York, NY (US)

(72) Inventors: Michael Won, South Elgin, IL (US); Troy Huber, Lombard, IL (US); Suresh Thankappan, Shrewsbury, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/936,758

(22) Filed: Jul. 23, 2020

(65) Prior Publication Data
US 2021/0029536 A1 Jan. 28, 2021

Related U.S. Application Data

(60) Provisional application No. 62/877,467, filed on Jul. 23, 2019.

(51) Int. Cl.
| | |
|---|---|
| H04W 8/26 | (2009.01) |
| H04W 4/14 | (2009.01) |
| H04L 65/00 | (2022.01) |

(52) U.S. Cl.
CPC .............. *H04W 8/26* (2013.01); *H04W 4/14* (2013.01)

(58) Field of Classification Search
CPC ......... H04W 4/14; H04W 8/26; H04W 88/06; H04W 16/14; H04W 8/22; H04L 65/103
See application file for complete search history.

(56) References Cited

U.S. PATENT DOCUMENTS

| | | | | |
|---|---|---|---|---|
| 10,187,128 B2* | 1/2019 | Bilotta | ................... | H04W 16/26 |
| 10,820,216 B2* | 10/2020 | Rucker | ................ | H04W 24/04 |
| 11,024,105 B1* | 6/2021 | Brand | ...................... | G07C 9/10 |
| 11,182,490 B2* | 11/2021 | Allen | ................... | H04L 63/0428 |
| 11,216,565 B1* | 1/2022 | Silva | ..................... | H04L 9/0866 |
| 2005/0201362 A1 | 9/2005 | Klein et al. | | |
| 2013/0145027 A1 | 6/2013 | Parthasarathy et al. | | |

(Continued)

OTHER PUBLICATIONS

International Search Report and Written Opinion of the International Searching Authority in corresponding International Application No. PCT/US2020/043234, dated Oct. 21, 2020.

*Primary Examiner* — Khawar Iqbal
(74) *Attorney, Agent, or Firm* — Greenblum & Bernstein, P.L.C.

(57) ABSTRACT

A method for facilitating regulatory compliance with respect to telephony communications is provided. The method includes: assigning, to a mobile telephone, an access number; routing a communication that relates to the assigned access number to a gateway; processing the routed communication to ensure compliance with all jurisdictional regulations, including real-time call recording and short message service (SMS) capturing for compliance archival and search, applying data loss prevention (DLP) rules, and any other suitable processing; and forwarding the processed communication to the mobile telephone. A subscriber identification module (SIM) that is associated with the access number is physically installed at the gateway. The communication may be a voice communication and/or an SMS text communication.

15 Claims, 6 Drawing Sheets

(56) References Cited

U.S. PATENT DOCUMENTS

| | | | |
|---|---|---|---|
| 2014/0315521 A1* | 10/2014 | Hitchcock | H04M 1/00 |
| | | | 455/412.1 |
| 2016/0164777 A1 | 6/2016 | Rucker et al. | |
| 2017/0013441 A1 | 1/2017 | Manik et al. | |
| 2018/0091656 A1* | 3/2018 | Zheng | H04M 3/42102 |
| 2019/0007835 A1* | 1/2019 | Li | H04W 12/069 |
| 2019/0268177 A1* | 8/2019 | Li | G10L 15/30 |
| 2020/0166670 A1* | 5/2020 | Zass | G06T 13/40 |
| 2020/0204403 A1* | 6/2020 | Gentili | H04L 12/66 |
| 2020/0304633 A1* | 9/2020 | Gayaldo | H04M 3/465 |
| 2020/0358626 A1* | 11/2020 | Ito | G06Q 20/145 |
| 2020/0389775 A1* | 12/2020 | Ravichandran | H04W 4/60 |
| 2022/0019679 A1* | 1/2022 | Macandrew | G06F 21/6236 |

* cited by examiner

METHOD AND SYSTEM FOR LOW DENSITY HOSTED TELEPHONY REGULATORY COMPLIANCE

CROSS-REFERENCE TO RELATED APPLICATIONS

This application claims the benefit of U.S. Provisional Patent Application Ser. No. 62/877,467, filed Jul. 23, 2019, which is hereby incorporated by reference in its entirety.

BACKGROUND

1. Field of the Disclosure

This technology generally relates to methods and systems for voice and short message service (SMS) telephony communications, and more particularly, to methods and systems for ensuring that regulatory requirements for voice and SMS communications are satisfied.

2. Background Information

Many corporate entities that operate globally face challenges with respect to meeting regulatory requirements in various jurisdictions for voice and short message service (SMS) communications. In this aspect, although some nations have either a mobile virtual network operator (MVNO) or a voice over Internet protocol (VoIP)-based solution, there is no single solution that is globally applicable. Further, although there is a relatively low volume of communications that are affected by this problem, violations of regulatory requirements are associated with significant fines and other penalties.

Accordingly, there is a need to provide a globally applicable solution for ensuring compliance with regulatory requirements for voice and SMS telephony communications.

SUMMARY

The present disclosure, through one or more of its various aspects, embodiments, and/or specific features or sub-components, provides, inter alia, various systems, servers, devices, methods, media, programs, and platforms for ensuring that regulatory requirements for voice and SMS communications are satisfied.

According to an aspect of the present disclosure, a method for facilitating regulatory compliance with respect to telephony communications is provided. The method is implemented by at least one processor. The method includes: assigning, to at least one from among a mobile telephone and a computer telephony application by the at least one processor, an access number; receiving, by the at least one processor, an incoming communication that relates to the assigned access number; routing, by the at least one processor, the received incoming communication to a gateway that is installed at a hosted facility; processing, by the at least one processor, the routed communication to ensure compliance with a predetermined plurality of jurisdictional regulations; and forwarding, by the at least one processor, the processed communication to the at least one from among the mobile telephone and the computer telephony application. A subscriber identification module (SIM) that is associated with the assigned access number is physically installed at the gateway.

The gateway may be a Global System for Mobile communications (GSM) over Internet Protocol (GoIP) gateway.

The assigning of the access number may include: registering the at least one from among the mobile telephone and the computer telephony application with the GoIP gateway; assigning a GoIP SIM number to the at least one of the mobile telephone and the computer telephony application; and associating the assigned SIM number with a personal number of a user of the at least one from among the mobile telephone and the computer telephony application.

The predetermined plurality of jurisdictional regulations may include a set of regulations that is applicable in a current geographical location of the GoIP gateway.

The incoming communication may include an incoming voice call.

The incoming communication may include an incoming short message service (SMS) text communication.

The processing of the routed communication may include applying at least one from among a data access rule that relates to an exposure of a predetermined data type to a predetermined entity and a functional access rule that relates to a performance of a predetermined function on the predetermined data type.

The applying of the at least one from among the data access rule and the functional access rule may include at least one from among real-time call recording for compliance archival and search, short message service (SMS) capturing for compliance archival and search, and applying at least one data loss prevention rule.

According to another aspect of the present disclosure, a computing apparatus for facilitating regulatory compliance with respect to telephony communications is provided. The computing apparatus includes comprising a processor, a memory, and a communication interface coupled to each of the processor and the memory. The processor is configured to: assign, to at least one from among a mobile telephone and a computer telephony application, an access number; receive, via the communication interface, an incoming communication that relates to the assigned access number; route the received incoming communication to a gateway that is installed at a hosted facility; process the routed communication to ensure compliance with a predetermined plurality of jurisdictional regulations; and forward, via the communication interface, the processed communication to the at least one from among the mobile telephone and the computer telephony application. A subscriber identification module (SIM) that is associated with the assigned access number is physically installed at the gateway.

The gateway may be a Global System for Mobile communications (GSM) over Internet Protocol (GoIP) gateway. The processor may be further configured to: register the at least one from among the mobile telephone and the computer telephony application with the GoIP gateway; assign a GoIP SIM number to the at least one of the mobile telephone and the computer telephony application; and associate the assigned SIM number with a personal number of a user of the at least one from among the mobile telephone and the computer telephony application.

The predetermined plurality of jurisdictional regulations may include a set of regulations that is applicable in a current geographical location of the GoIP gateway.

The incoming communication may include an incoming voice call.

The incoming communication may include an incoming short message service (SMS) text communication.

The processor may be further configured to apply, to the routed communication, at least one from among a data access rule that relates to an exposure of a predetermined data type to a predetermined entity and a functional access rule that relates to a performance of a predetermined function on the predetermined data type.

The processor may be further configured to execute, with respect to the routed communication, at least one from among a real-time call recording operation for compliance archival and search, a short message service (SMS) capturing operation for compliance archival and search, and an application of at least one data loss prevention rule.

According to yet another aspect of the present disclosure, a method for facilitating regulatory compliance with respect to telephony communications is provided. The method is implemented by at least one processor. The method includes: assigning, to at least one from among a mobile telephone and a computer telephony application by the at least one processor, an access number; receiving, by the at least one processor from the at least one from among the mobile telephone and the computer telephony application, an outgoing communication; routing, by the at least one processor, the received outgoing communication to a gateway that is installed at a hosted facility; processing, by the at least one processor, the routed communication to ensure compliance with a predetermined plurality of jurisdictional regulations; and forwarding, by the least one processor, the processed communication to an intended destination. A subscriber identification module (SIM) that is associated with the assigned access number is physically installed at the gateway.

The gateway may be a Global System for Mobile communications (GSM) over Internet Protocol (GoIP) gateway. The assigning of the access number may include: registering the at least one from among the mobile telephone and the computer telephony application with the GoIP gateway; assigning a GoIP SIM number to the at least one of the mobile telephone and the computer telephony application; and associating the assigned SIM number with a personal number of a user of the at least one from among the mobile telephone and the computer telephony application.

The predetermined plurality of jurisdictional regulations may include a set of regulations that is applicable in a current geographical location of the GoIP gateway.

The outgoing communication may include an outgoing voice call.

The outgoing communication may include an outgoing short message service (SMS) text communication.

The processing of the routed communication may include at least one from among real-time call recording for compliance archival and search, short message service (SMS) capturing for compliance archival and search, and applying at least one data loss prevention rule.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
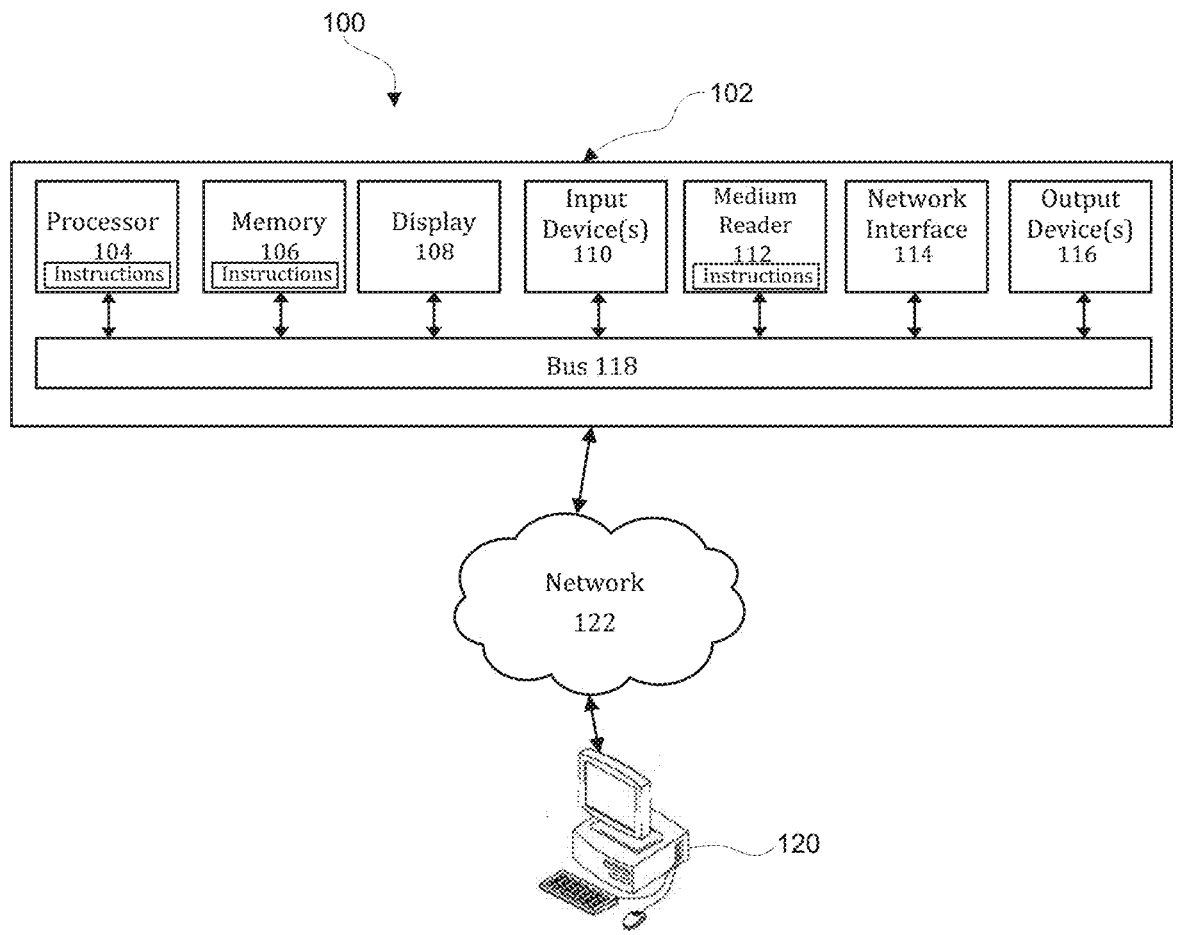
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for ensuring that regulatory requirements for voice and SMS communications are satisfied.

Figure 2:
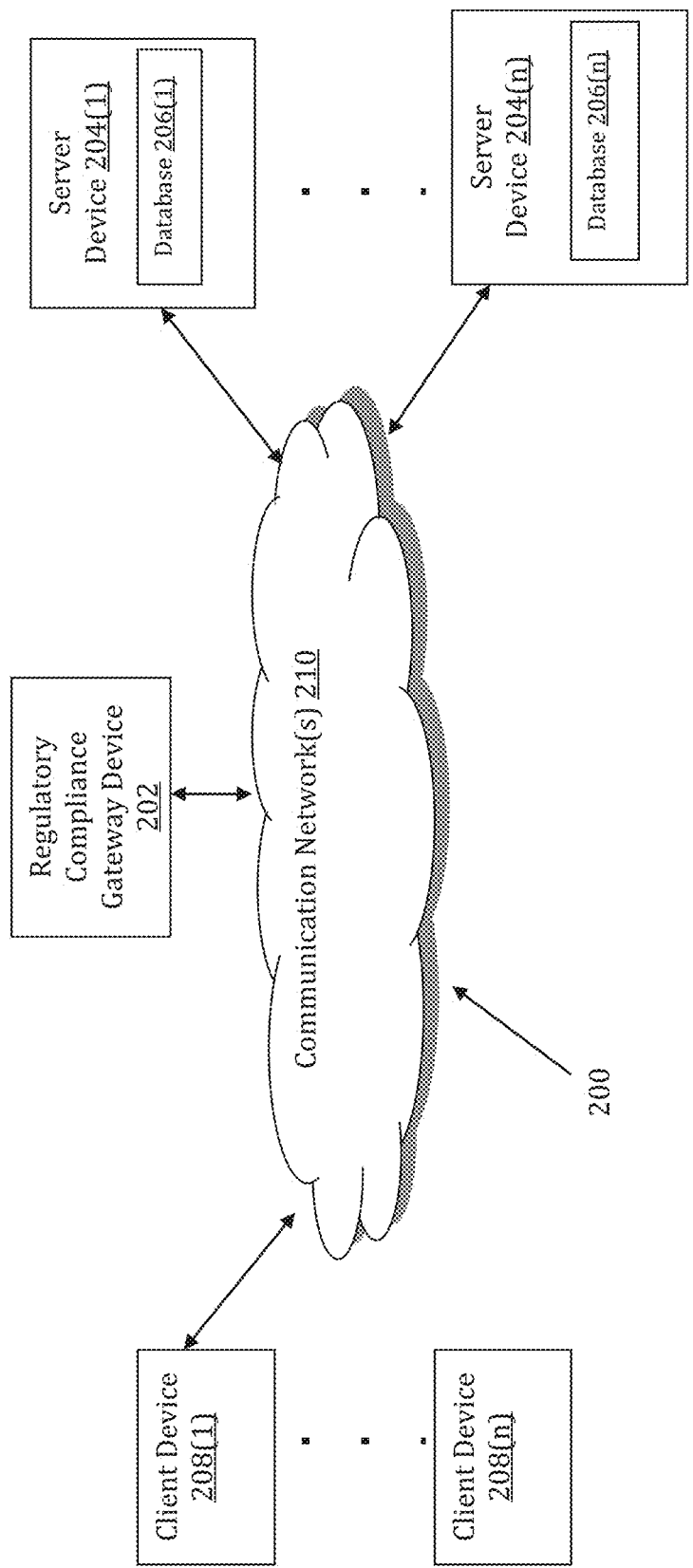
FIG. 2 illustrates an exemplary diagram of a network environment.

Referring to FIG. 2, a schematic of an exemplary network environment 200 for implementing a method for ensuring that regulatory requirements for voice and SMS communications are satisfied is illustrated. In an exemplary embodiment, the method is executable on any networked computer platform, such as, for example, a personal computer (PC).

The method for ensuring that regulatory requirements for voice and SMS communications are satisfied may be implemented by a Regulatory Compliance Gateway (RCG) device 202. The RCG device 202 may be the same or similar to the computer system 102 as described with respect to FIG. 1. The RCG device 202 may store one or more applications that can include executable instructions that, when executed by the RCG device 202, cause the RCG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RCG device 202 itself, may be located in virtual server(s) running in a cloud-based computing environment rather than being tied to one or more specific physical network computing devices. Also, the application(s) may be running in one or more virtual machines (VMs) executing on the RCG device 202. Additionally, in one or more embodiments of this technology, virtual machine(s) running on the RCG device 202 may be managed or supervised by a hypervisor.

In the network environment 200 of FIG. 2, the RCG device 202 is coupled to a plurality of server devices 204(1)-204(n) that hosts a plurality of databases 206(1)-206(n), and also to a plurality of client devices 208(1)-208(n) via communication network(s) 210. A communication interface of the RCG device 202, such as the network interface 114 of the computer system 102 of FIG. 1, operatively couples and communicates between the RCG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RCG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RCG devices that efficiently implement a method for ensuring that regulatory requirements for voice and SMS communications are satisfied.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RCG device 202 may be a standalone device or integrated with one or more other devices or apparatuses, such as one or more of the server devices 204(1)-204(n), for example. In one particular example, the RCG device 202 may include or be hosted by one of the server devices 204(1)-204(n), and other arrangements are also possible. Moreover, one or more of the devices of the RCG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RCG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information models that describe classes of information and relationships between the information classes for systems and domains of data, and policies and access control rules, which include data access rules that relate to exposure of particular data types to particular entities, functional access rules that relate to an ability to perform particular functions on particular data types, and governing principles that are reflected by the data access rules and functional access rules.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the RCG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RCG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the RCG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RCG device 202, the server devices 204(1)-204(n), or the client devices 208(1)-208(n), for example, may be configured to operate as virtual instances on the same physical machine. In other words, one or more of the RCG device 202, the server devices 204(1)-204(n), or the client devices 208(1)-208(n) may operate on the same physical device rather than as separate devices communicating through communication network(s) 210. Additionally, there may be more or fewer RCG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
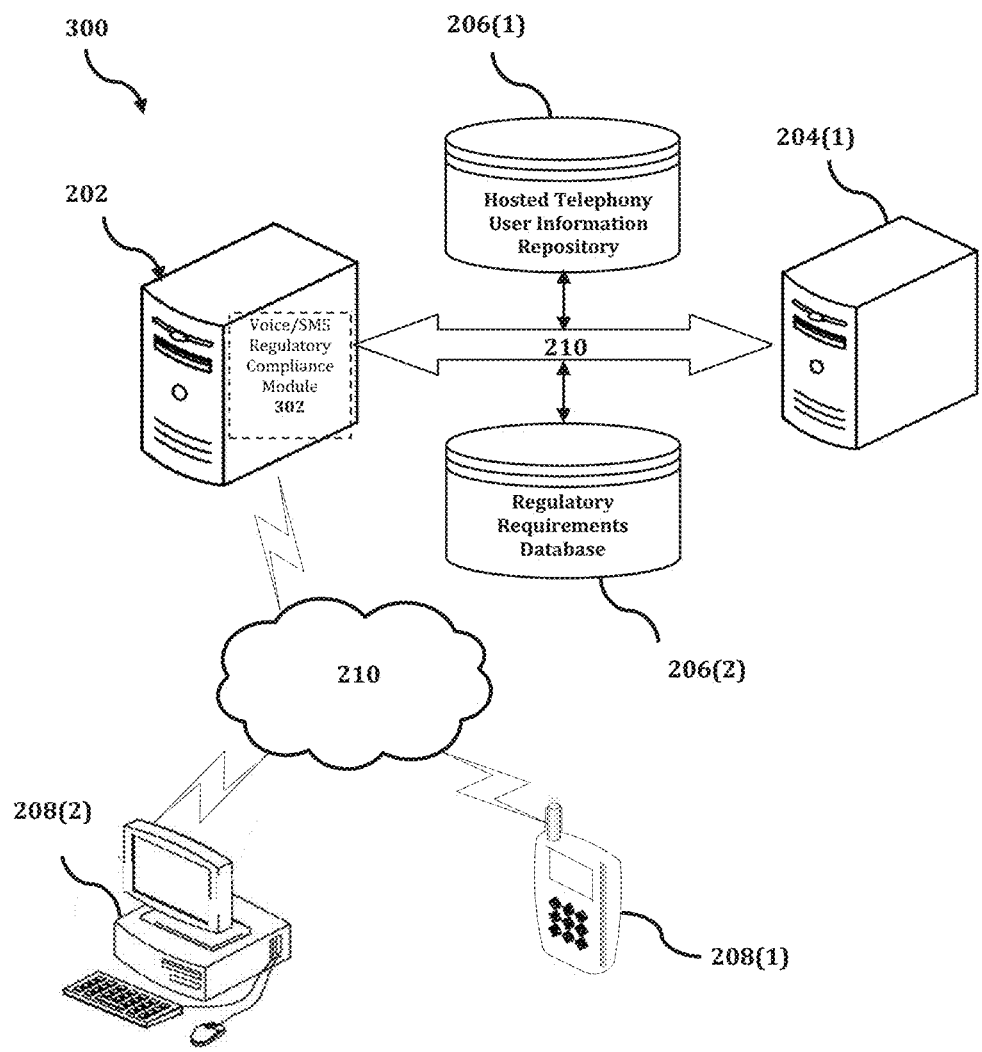
FIG. 3 shows an exemplary system for implementing a method for ensuring that regulatory requirements for voice and SMS communications are satisfied.

The RCG device 202 is described and shown in FIG. 3 as including a voice/SMS regulatory compliance module 302, although it may include other rules, policies, modules, databases, or applications, for example. As will be described below, the access control policy definition module 302 is configured to implement a method for ensuring that regulatory requirements for voice and SMS communications are satisfied in an automated, efficient, scalable, and reliable manner.

An exemplary process 300 for implementing a mechanism for ensuring that regulatory requirements for voice and SMS communications are satisfied by utilizing the network environment of FIG. 2 is shown as being executed in FIG. 3. Specifically, a first client device 208(1) and a second client device 208(2) are illustrated as being in communication with RCG device 202. In this regard, the first client device 208(1) and the second client device 208(2) may be "clients" of the RCG device 202 and are described herein as such. Nevertheless, it is to be known and understood that the first client device 208(1) and/or the second client device 208(2) need not necessarily be "clients" of the RCG device 202, or any entity described in association therewith herein. Any additional or alternative relationship may exist between either or both of the first client device 208(1) and the second client device 208(2) and the RCG device 202, or no relationship may exist.

Further, RCG device 202 is illustrated as being able to access a hosted telephony user information repository 206(1) and a regulatory requirements database 206(2). The voice/SMS regulatory compliance module 302 may be configured to access these databases for implementing a method for ensuring that regulatory requirements for voice and SMS communications are satisfied.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RCG device 202 via broadband or cellular communication. Of course, these embodiments are merely exemplary and are not limiting or exhaustive.

Upon being started, the voice/SMS regulatory compliance module 302 executes a process ensuring that regulatory requirements for voice and SMS communications are satisfied. An exemplary process for ensuring that regulatory requirements for voice and SMS communications are satisfied is generally indicated at flowchart 400 in FIG. 4.

Figure 4:
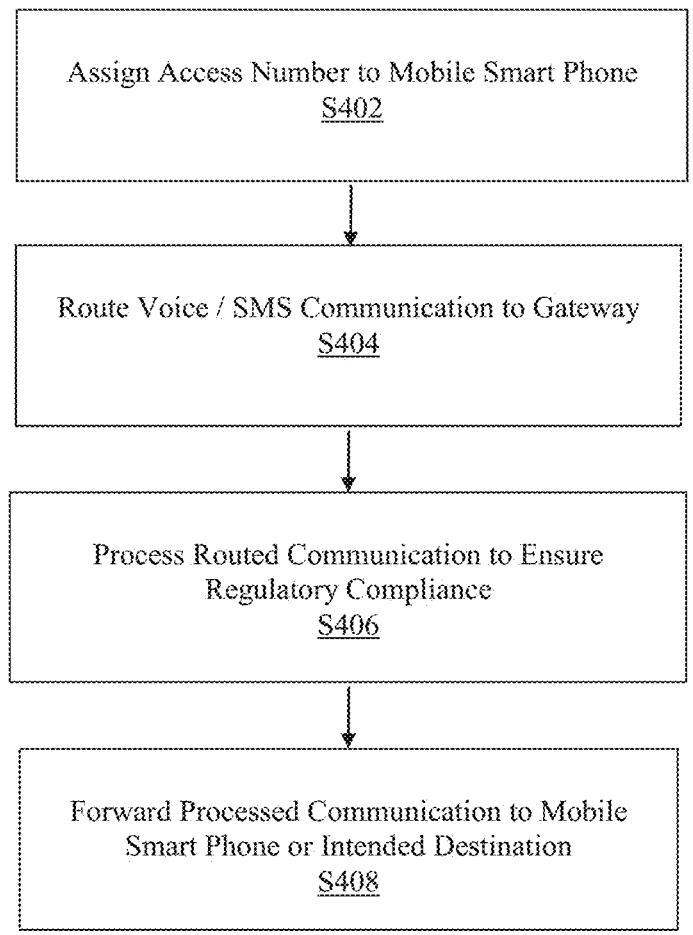
FIG. 4 is a flowchart of an exemplary process for implementing a method for ensuring that regulatory requirements for voice and SMS communications are satisfied.

In the process 400 of FIG. 4, at step S402, an access number is assigned to a mobile smart phone or a computer telephony application for use in a low density hosted telephony network infrastructure. In an exemplary embodiment, the mobile smart phone has previously been assigned a number for use in a public mobile cellular communication system within the nation in which the user resides, but the user intends to travel abroad, and so an additional access number is assigned to the mobile smart phone for use within the low density hosted telephony infrastructure.

At step S404, a communication that relates to the newly assigned access number is routed to a gateway that is associated with the low density hosted telephony network infrastructure. The communication may include, for example, any of an incoming voice call, an incoming SMS text communication, an outgoing voice call, and an outgoing SMS text communication. The gateway is equivalent to the RCG device 202, and includes the voice/SMS regulatory compliance module 302. The gateway also includes a subscriber identification module (SIM) card that is associated with the newly assigned access number. In this aspect, such a SIM card might typically be physically installed in the mobile smart phone, but is instead physically installed at the gateway.

At step S406, the voice/SMS regulatory compliance module 302 processes the routed communication in order to ensure compliance with all jurisdictional regulations. In an exemplary embodiment, the jurisdictional regulations include all governmental and local laws, rules, and regulations that are applicable to a physical or geographical location of the gateway. The jurisdictional regulations may also include policies and access control rules, which include data access rules that relate to exposure of particular data types to particular entities, functional access rules that relate to an ability to perform particular functions on particular data types, and governing principles that are reflected by the data access rules and functional access rules. The processing of the routed communication may include, for example, real-time call recording and SMS capturing for compliance archival and search and/or an application of data loss prevention (DLP) rules.

Then, at step S408, for an incoming voice call or SMS text message, the processed communication is forwarded to the mobile smart phone or computer telephony application. For an outgoing voice call or SMS text message, the processed communication is forwarded to an intended destination.

Figure 5:
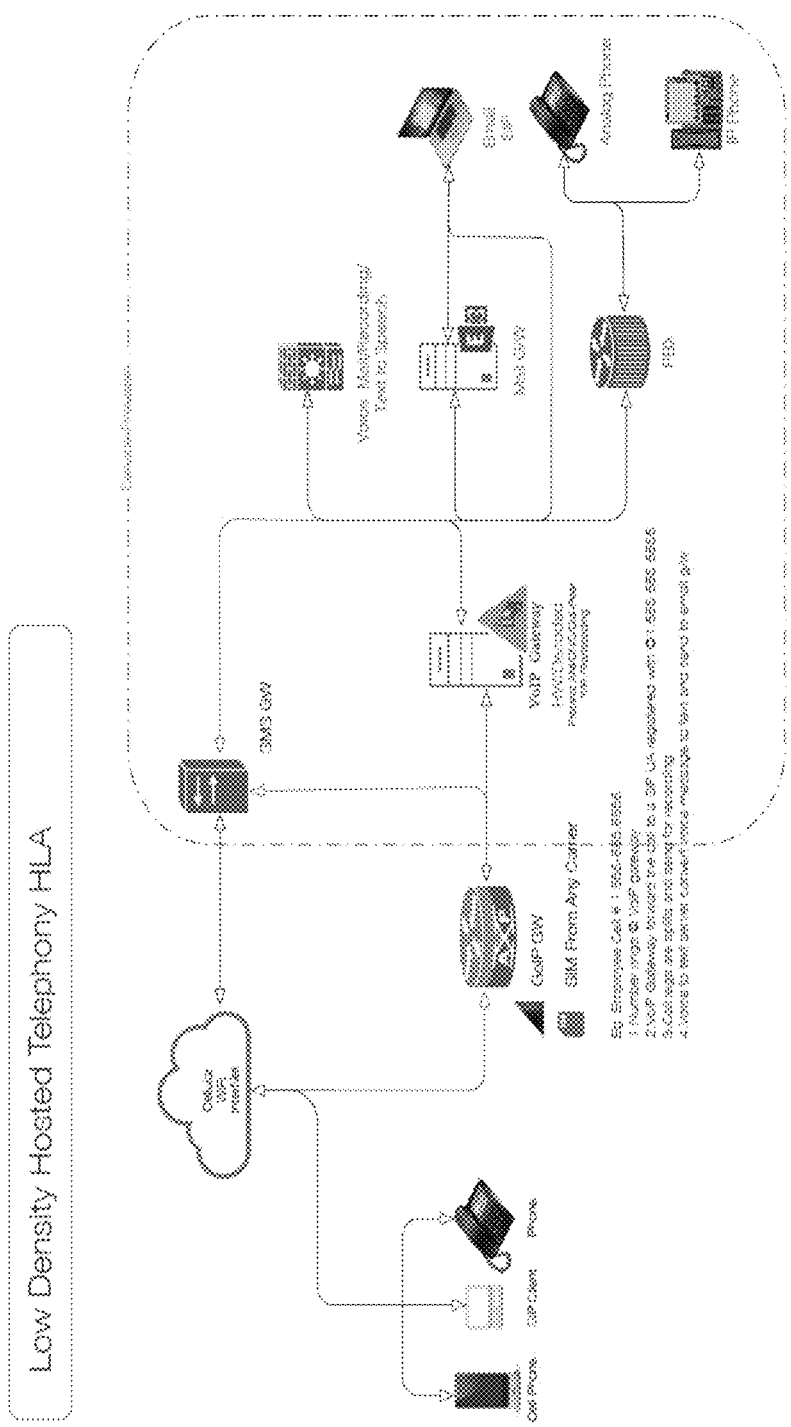
FIG. 5 is a diagram of a low density hosted telephony system architecture, according to an exemplary embodiment.
Figure 6:
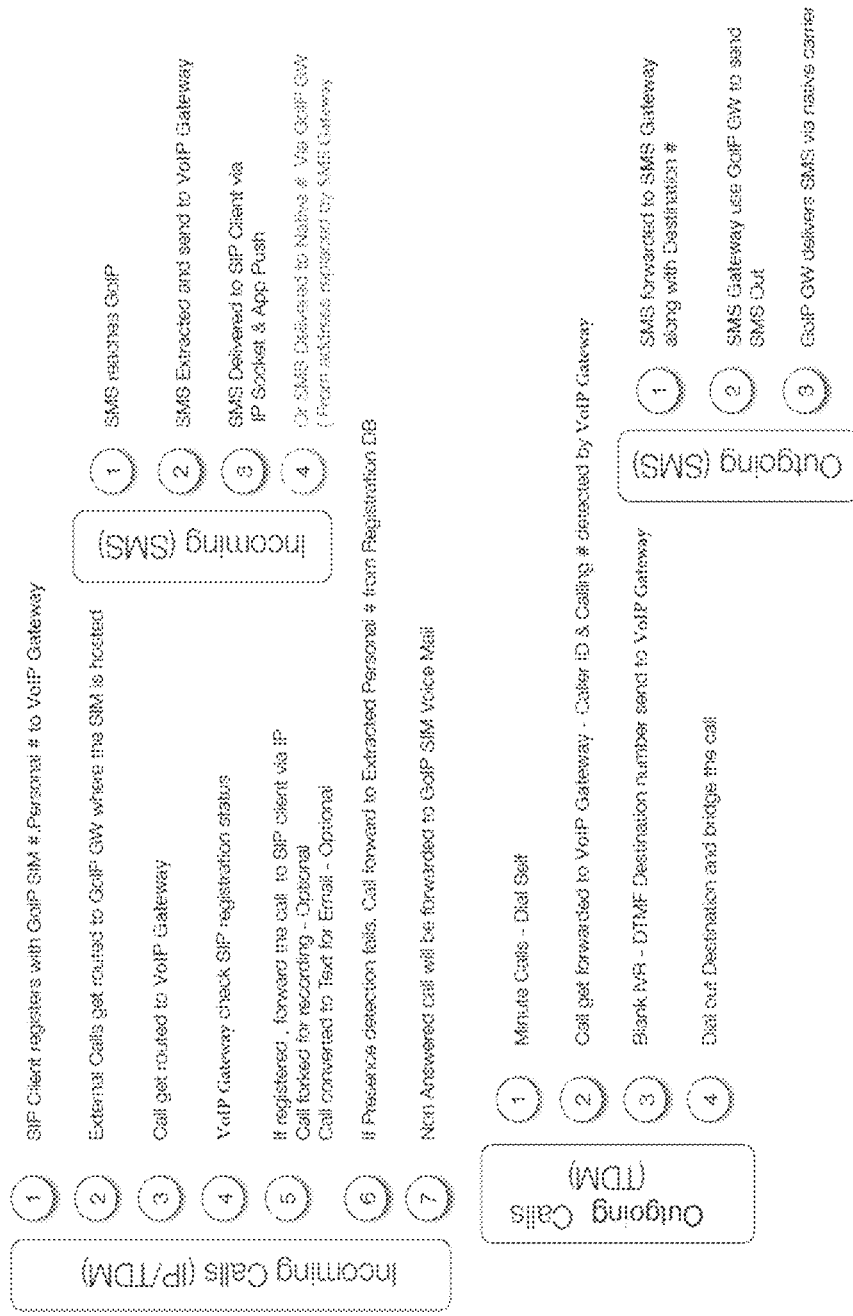
FIG. 6 is an exemplary event flow diagram for handling of voice and SMS communications, according to an exemplary embodiment.

Referring to FIG. 5, a diagram of an exemplary low density hosted telephony system architecture is illustrated. Referring to FIG. 6, an exemplary event flow diagram for handling of voice and SMS communications by using the architecture of FIG. 5 is illustrated. In the example illustrated in FIGS. 5 and 6, a Session Initiation Protocol (SIP) client is registered with a Global System for Mobile communications (GSM) over Internet Protocol (GoIP) gateway (GoIP GW), which may be implemented as the RCG device 202. The registration with the GSM GoIP GW includes an assignment of a GoIP SIM number, an association of the assigned number with a personal number that corresponds to the client, and a SIM card that corresponds to the assigned number is installed in the GoIP GW.

When an incoming voice call is received, the call is routed to the GoIP GW. The GoIP GW uses the voice/SMS regulatory compliance module 302 to process the incoming call in order to ensure that the local regulatory requirements are satisfied. The call is then routed to VoIP Gateway, which is a software implementation of a private branch exchange (PBX), for normal incoming call handling. VoIP Gateway checks the SIP registration status to ensure that the intended call recipient has been registered, and then forwards the call to the SIP client via a standard Internet Protocol (IP) route. Optionally, the call may also be forwarded to a recording component for voice mail recording. In addition, the call may also optionally be forwarded to voice-to-text converting component so that the voice may be converted to text for an email message.

If a presence detection fails, the call may be forwarded to the extracted personal number. A non-answered call will be forwarded to a GoIP SIM voice mail component, according to an exemplary embodiment.

When a client desires to place an outgoing call, the call is routed through the GoIP GW, which uses the voice/SMS regulatory compliance module 302 to process the outgoing call in order to ensure that the call is in compliance with the regulatory requirements. The call is then routed to VoIP Gateway, which detects the caller identification and the number of the intended destination. The outgoing call is then bridged to the intended destination.

When an incoming SMS text message is received, the SMS text message is routed to the GoIP GW, which uses the voice/SMS regulatory compliance module 302 to process the incoming SMS text message in order to ensure compliance with the regulatory requirements. The SMS text message is extracted and forwarded to VoIP Gateway, which either delivers the SMS text message to the client via IP Socket and App Push or directly delivers the message to the client via the associated personal number.

When a client desires to send an SMS text message, the SMS text message is forwarded to SMS Gateway, which is a SMS gateway. SMS Gateway uses the GoIP GW to process the SMS text message to ensure regulatory compliance. The GoIP GW then delivers the SMS text message to the destination via a native carrier.

Accordingly, with this technology, an optimized process for ensuring that regulatory requirements for voice and SMS communications are satisfied is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating regulatory compliance with respect to telephony communications, the method being implemented by at least one processor, the method comprising:

assigning, to at least one from among a mobile telephone and a computer telephony application by the at least one processor, an access number;

receiving, by the at least one processor, an incoming communication that relates to the assigned access number;

routing, by the at least one processor, the received incoming communication to a gateway that is installed at a hosted facility;

processing, by the at least one processor, the routed communication to ensure compliance with a predetermined plurality of jurisdictional regulations; and forwarding, by the at least one processor, the processed communication to the at least one from among the mobile telephone and the computer telephony application, wherein a subscriber identification module (SIM) that is associated with the assigned access number is physically installed at the gateway, wherein the processing of the routed communication includes applying at least one from among a data access rule that relates to an exposure of a predetermined data type to a predetermined entity and a functional access rule that relates to a performance of a predetermined function on the predetermined data type, and wherein the applying of the at least one from among the data access rule and the functional access rule includes at least one from among short message service (SMS) capturing for compliance archival and search and applying at least one data loss prevention rule.

2. The method of claim 1, wherein:

the gateway is a Global System for Mobile communications (GSM) over Internet Protocol (GoIP) gateway, and the assigning of the access number comprises:

registering the at least one from among the mobile telephone and the computer telephony application with the GoIP gateway;

assigning a GoIP SIM number to the at least one of the mobile telephone and the computer telephony application; and associating the assigned SIM number with a personal number of a user of the at least one from among the mobile telephone and the computer telephony application.

3. The method of claim 2, wherein the predetermined plurality of jurisdictional regulations includes a set of regulations that is applicable in a current geographical location of the GoIP gateway.

4. The method of claim 3, wherein the incoming communication includes an incoming voice call.

5. The method of claim 3, wherein the incoming communication includes an incoming short message service (SMS) text communication.

6. A computing apparatus for facilitating regulatory compliance with respect to telephony communications, the computing apparatus comprising:
  a processor;
  a memory; and
  a communication interface coupled to each of the processor and the memory,
  wherein the processor is configured to:
    assign, to at least one from among a mobile telephone and a computer telephony application, an access number;
    receive, via the communication interface, an incoming communication that relates to the assigned access number;
    route the received incoming communication to a gateway that is installed at a hosted facility;
    process the routed communication to ensure compliance with a predetermined plurality of jurisdictional regulations; and
    forward, via the communication interface, the processed communication to the at least one from among the mobile telephone and the computer telephony application,
  wherein a subscriber identification module (SIM) that is associated with the assigned access number is physically installed at the gateway, and
  wherein the processor is further configured to apply, to the routed communication, at least one from among a data access rule that relates to an exposure of a predetermined data type to a predetermined entity and a functional access rule that relates to a performance of a predetermined function on the predetermined data type, and
  wherein the processor is further configured to execute, with respect to the routed communication, at least one from among a short message service (SMS) capturing operation for compliance archival and search and an application of at least one data loss prevention rule.

7. The computing apparatus of claim 6, wherein:
the gateway is a Global System for Mobile communications (GSM) over Internet Protocol (GoIP) gateway, and
the processor is further configured to:
  register the at least one from among the mobile telephone and the computer telephony application with the GoIP gateway;
  assign a GoIP SIM number to the at least one of the mobile telephone and the computer telephony application; and
  associate the assigned SIM number with a personal number of a user of the at least one from among the mobile telephone and the computer telephony application.

8. The computing apparatus of claim 7, wherein the predetermined plurality of jurisdictional regulations includes a set of regulations that is applicable in a current geographical location of the GoIP gateway.

9. The computing apparatus of claim 8, wherein the incoming communication includes an incoming voice call.

10. The computing apparatus of claim 8, wherein the incoming communication includes an incoming short message service (SMS) text communication.

11. A method for facilitating regulatory compliance with respect to telephony communications, the method being implemented by at least one processor, the method comprising:
  assigning, to at least one from among a mobile telephone and a computer telephony application by the at least one processor, an access number;
  receiving, by the at least one processor from the at least one from among the mobile telephone and the computer telephony application, an outgoing communication;
  routing, by the at least one processor, the received outgoing communication to a gateway that is installed at a hosted facility;
  processing, by the at least one processor, the routed communication to ensure compliance with a predetermined plurality of jurisdictional regulations; and
  forwarding, by the least one processor, the processed communication to an intended destination,
  wherein a subscriber identification module (SIM) that is associated with the assigned access number is physically installed at the gateway,
  wherein the processing of the routed communication includes applying at least one from among a data access rule that relates to an exposure of a predetermined data type to a predetermined entity and a functional access rule that relates to a performance of a predetermined function on the predetermined data type, and
  wherein the processing of the routed communication includes at least one from among short message service (SMS) capturing for compliance archival and search and applying at least one data loss prevention rule.

12. The method of claim 11, wherein:
the gateway is a Global System for Mobile communications (GSM) over Internet Protocol (GoIP) gateway; and
the assigning of the access number comprises:
  registering the at least one from among the mobile telephone and the computer telephony application with the GoIP gateway;
  assigning a GoIP SIM number to the at least one of the mobile telephone and the computer telephony application; and
  associating the assigned SIM number with a personal number of a user of the at least one from among the mobile telephone and the computer telephony application.

13. The method of claim 12, wherein the predetermined plurality of jurisdictional regulations includes a set of regulations that is applicable in a current geographical location of the GoIP gateway.

14. The method of claim 13, wherein the outgoing communication includes an outgoing voice call.

15. The method of claim 13, wherein the outgoing communication includes an outgoing short message service (SMS) text communication.

* * * * *